US012762749B2

(12) United States Patent
Yuan et al.

(10) Patent No.: US 12,762,749 B2
(45) Date of Patent: Oct. 13, 2026

(54) POINT CLOUD PROCESSING METHOD, DECODER AND STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Hao Liu, Dongguan (CN); Tingting Wang, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 300 days.

(21) Appl. No.: 18/431,412

(22) Filed: Feb. 2, 2024

(65) Prior Publication Data

US 2024/0177353 A1 May 30, 2024

Related U.S. Application Data

(63) Continuation of application No. PCT/CN2021/111300, filed on Aug. 6, 2021.

(51) Int. Cl.
*G06T 9/00* (2006.01)
*G06T 3/4046* (2024.01)

(52) U.S. Cl.
CPC ............ *G06T 9/001* (2013.01); *G06T 3/4046* (2013.01); *G06T 9/002* (2013.01)

(58) Field of Classification Search
CPC ....... G06T 9/001; G06T 3/4046; G06T 9/002; G06T 17/00; G06T 2210/56; G06N 3/045; G06N 3/0475; G06N 3/094
See application file for complete search history.

(56) References Cited

U.S. PATENT DOCUMENTS

2019/0147320 A1 5/2019 Mattyus
2022/0335654 A1* 10/2022 Cai ......................... G06F 18/25

FOREIGN PATENT DOCUMENTS

CN 107862293 A 3/2018
CN 111680541 A * 9/2020 ............. G06N 3/045
CN 111862289 A 10/2020
(Continued)

OTHER PUBLICATIONS

Point Cloud Upsampling via Disentangled Refinement (Year: 2021).*
(Continued)

*Primary Examiner* — Huo Long Chen
(74) *Attorney, Agent, or Firm* — BAYES PLLC

(57) ABSTRACT

A GAN-based point cloud processing method, decoder and computer-readable storage medium are provided. The method includes: a first point cloud is input into a feature extraction module to obtain a first feature of a point in the first point cloud; the first feature is input into a coarse feature extension module to obtain a second feature; the second feature is input into a geometry generation module to map the second feature from a feature space to a geometric space to obtain a second point cloud; the second feature and the second point cloud are input into a geometric offset prediction module to determine the offset of points in the second point cloud in the geometric space; and a third point cloud according to the second point cloud and the offset is obtained.

18 Claims, 10 Drawing Sheets

(56) References Cited

FOREIGN PATENT DOCUMENTS

| | | | | |
|---|---|---|---|---|
| CN | 112348959 A | | 2/2021 | |
| CN | 112561796 A | | 3/2021 | |
| CN | 112907644 A | * | 6/2021 | ............... G06N 7/01 |

OTHER PUBLICATIONS

PU-GAN: a Point Cloud Upsampling Adversarial Network (Year: 2019).*

Supplementary European Search Report in the European application No. 21952435.2, mailed on May 2, 2025. 11 pages.

Ruihui Li et al: "Point Cloud Upsampling via Disentangled Refinement", arxiv. org, Cornell University Library, 201OLIN Library Cornell University Ithaca, NY 14853, Jun. 9, 2021 (Jun. 9, 2021), XP081987031, abstract, section 3, in particular figure 2, showing the network architecture.

International Search Report in the international application No. PCT/CN2021/111300, mailed on Apr. 29, 2022. 5 pages with English translation.

Written Opinion of the International Search Authority in the international application No. PCT/CN2021/111300, mailed on Apr. 29, 2022. 6 pages with English translation.

* cited by examiner

POINT CLOUD PROCESSING METHOD, DECODER AND STORAGE MEDIUM

CROSS-REFERENCE TO RELATED APPLICATION

This application is a continuation of International Application No. PCT/CN2021/111300 filed on Aug. 6, 2021, the disclosure of which is hereby incorporated by reference in its entirety.

BACKGROUND

The point cloud has begun to spread to various fields, such as virtual/augmented reality, robotics, geographic information systems, medical fields and so on. The point cloud (data) on the surface of an object can be collected by the acquisition devices such as photoelectric radar, laser radar, laser scanner, multi-view camera, etc. In the process of collecting point cloud data, the point cloud data may be sparse or uneven due to object occlusion, equipment noise or light influence, so the precision of the point cloud data is low. In practical applications, a relatively high precision of point cloud data may be required. For example, in the field of automatic driving, a lot of post-processing (such as, de-noising, up-sampling, etc.) needs to be done on the sparse point cloud collected by radar to improve the precision of the point cloud, so as to improve the safety of the driving.

At present, the precision of the point cloud data can be improved based on generative adversarial networks (GAN). However, the precision of the point cloud generated by the GAN is still low, which cannot meet the requirements of generating the point cloud of higher quality.

SUMMARY

Embodiments of the present disclosure relate to the field of computer vision and more particularly to a point cloud processing method, a decoder and a computer-readable storage medium.

In a first aspect, there is provided a point cloud processing method based on a GAN. The GAN includes a generator. The generator includes a feature extraction module, a coarse feature expansion module, a geometry generation module and a geometry offset prediction module. The method includes the following operations.

A first point cloud is input into the feature extraction module to obtain a first feature of a point of the first point cloud.

The first feature is input into the coarse feature expansion module to up-sample the first feature to obtain a second feature.

The second feature is input into the geometry generation module to map the second feature from a feature space to a geometry space to obtain a second point cloud.

The second feature and the second point cloud are input into the geometry offset prediction module to determine an offset value of a point in the second point cloud in the geometry space.

A third point cloud is obtained based on the second point cloud and the offset value.

In a second aspect, there is provided a decoder which is used for performing the method in the first aspect or various implementations thereof. In particular, the decoder includes functional modules for performing the method in the first aspect or various implementations thereof.

In a third aspect, there is provided a computer-readable storage medium for storing a computer program that causes a computer to perform the method in the first aspect or implementations thereof.

DETAILED DESCRIPTION

Figure 1:
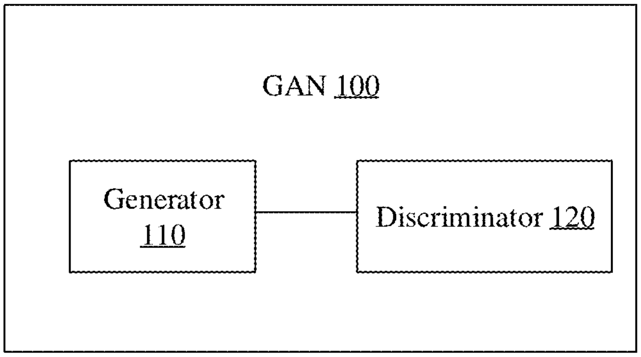
FIG. 1 is a diagram of a structure of a GAN according to an embodiment of the present disclosure.

The technical solution of the embodiments of the present disclosure will be described below in conjunction with the drawings in the embodiments of the present disclosure, and it will be apparent that the described embodiments are part of the embodiments of the present disclosure, but not all of the embodiments of the present disclosure. With respect to the embodiments in the present disclosure, all other embodiments obtained by those of ordinary skill in the art without making creative efforts fall within the scope of protection of the present disclosure.

Firstly, relevant terms related to the embodiments of the present disclosure will be explained.

The point cloud is the three-dimensional representation of the surface of an object, and the point cloud may refer to the collection of massive three-dimensional points. Points in the point cloud may include position information of the points and attribute information of the points. As an example, the position information of the points may be three-dimensional coordinate information of the points. The position information of the points can also be referred to as the geometry information of the points. By way of example, the attribute information of the points may include color information and/or reflectivity and the like, which is not limited in the present disclosure.

In order to improve the precision of the point cloud, according to the embodiments of the present disclosure, after extracting a feature of a point cloud, a coarse feature of the point cloud can be obtained by performing up-sampling on the feature, and the coarse feature is mapped to a geometry space to obtain an up-sampled coarse point cloud, and then an offset value of each point in the coarse point cloud in the geometry space is obtained based on the coarse point cloud and the coarse feature that are subjected to the up-sampling, the coarse point cloud can be corrected based on the offset value, so that the distribution of the coarse point cloud is closer to the ground truth, which contributes to improving the precision of the point cloud.

Exemplarily, the embodiments of the present disclosure can be applied to scenes requiring the use of higher precision of point cloud data, such as the automatic driving field, the medical field, the robotics field, the virtual/augmented reality, or other scenes or fields requiring the improvement of precision of the point cloud, which are not limited in the present disclosure.

As a concrete example, in practical application, point clouds of different precision can be obtained by scale progressive encoding. At the encoding side adopting the scale progressive point cloud coding scheme, set information of the point cloud is encoded sequentially based on the octree level, and for attribute information of the point cloud, an attribute value corresponding to the currently encoded geometry information is encoded by using a color compression method. At the decoding side adopting the scale progressive point cloud coding scheme, based on the actual demand, the octree level can be sequentially decoded to the specified threshold to obtain the point cloud with corresponding geometry precision, and then the corresponding attribute information can be decoded to finally obtain the reconstructed point cloud with the specified precision.

However, the scale progressive point cloud coding scheme can only reconstruct the point cloud to the original scale of the point cloud at most when being collected, and cannot obtain a high-quality point cloud with higher precision than the original. Based on this, after obtaining the point cloud with low precision through a scale progressive point cloud codec scheme, the point cloud processing method according to an embodiment of the present disclosure can further be applied to process the point cloud with low precision to obtain the point cloud with higher precision (or resolution), thereby satisfying the task requirements for the high precision of the point cloud.

According to the embodiments of the present disclosure, the up-sampling on the point cloud can be realized based on the GAN architecture to obtain the point cloud with higher precision. FIG. 1 illustrates a diagram of a structure 100 of a GAN. As illustrated in FIG. 1, the GAN includes a generator 110 and a discriminator 120. In the GAN technology, the generation problem is regarded as the adversary and game between the two networks, the discriminator and the generator. The generator generates composite data, such as sampling the input low resolution point cloud to the high resolution point cloud, and the discriminator distinguishes the output of the generator from the real data. For example, the discriminator distinguishes whether the input point cloud comes from the output of the generator or the ground truth, so that the generator generates data closer to the ground truth. The generator tries to generate data closer to the ground truth, while the discriminator tries to distinguish the real data from the generated data more perfectly. Therefore, the two networks, the generator and the discriminator, progress in the adversary, and then continue the adversary, so that the data obtained by the generator is getting closer and closer to the real data, therefore the desired data, such as pictures, sequences, videos, etc., can be generated.

In the present disclosure, an example of taking the data as the point cloud is taken for illustration. It should be noted that in the embodiments of the present disclosure, the up-sampling on the geometry information of the point cloud is taken as an example, which is not limited. For example, the attribute information or other information of the point cloud may be up-sampled according to the point cloud processing method of the embodiments of the present disclosure.

Figure 2:
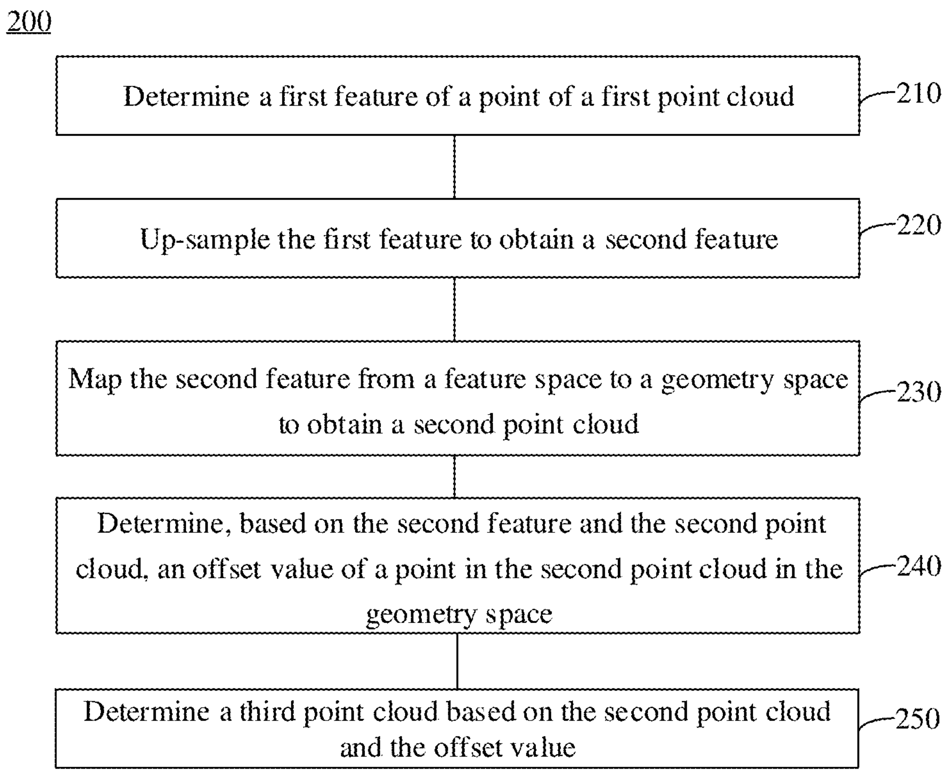
FIG. 2 is a schematic flowchart of a point cloud processing method according to an embodiment of the present disclosure.

FIG. 2 illustrates a schematic flowchart of a point cloud processing method 200 according to an embodiment of the present disclosure. The method 200 may be performed by a GAN, such as the GAN architecture 100 illustrated in FIG. 1. As illustrated in FIG. 2, the method 200 includes operations 210 to 250.

Figure 3:
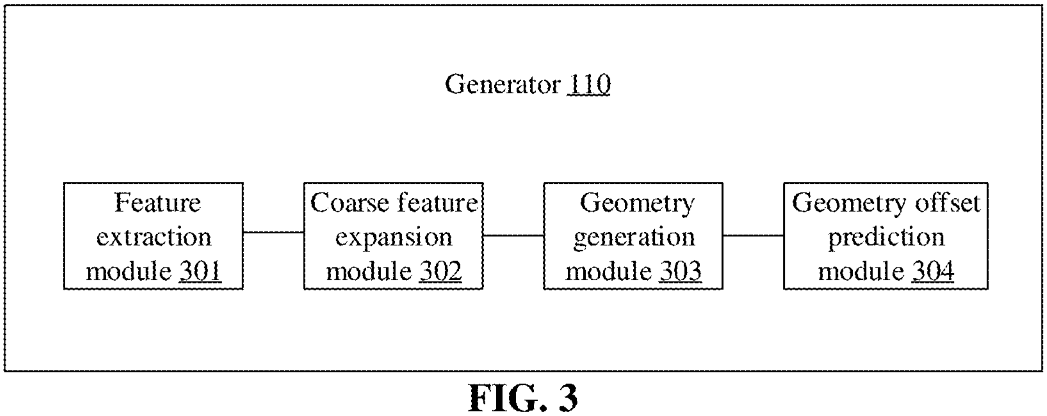
FIG. 3 is a diagram of network architecture of a generator according to an embodiment of the present disclosure.

The operations 210 to 250 may be performed by a generator 110 in the GAN architecture 100. The generator 110 is used to up-sample an input point cloud with low resolution to a point cloud with high resolution. FIG. 3 illustrates a diagram of network architecture of the generator 110 according to the embodiments of the present disclosure. The generator 110 may include a feature extraction module 301, a coarse feature expansion module 302, a geometry generation module 303, and a geometry offset prediction module 304. Each flow of the method 200 will be described below in connection with the network architecture of FIG. 3.

It can be understood that in the embodiment of the present disclosure, the point cloud processing method is described by taking the generator 110 including the feature extraction module 301, the coarse feature expansion module 302, the geometry generation module 303 and the geometry offset prediction module 304 as an example. In practical application, any apparatus (such as, a point cloud processing apparatus, or a decoder) including modules or units capable of realizing the functions of the feature extraction module 301, the coarse feature expansion module 302, the geometry generation module 303 and the geometry offset prediction module 304 can realize the method according to the embodiments of the present disclosure, and all belong to the protection scope of the embodiments of the present disclosure.

In the operation 210, a first feature of a point of a first point cloud is determined.

Exemplarily, the first point cloud may be input into a feature extraction module to obtain the first feature of the point of the first point cloud. That is, the feature extraction module extracts features of the first point cloud input into the feature extraction module and obtains the first feature of the point of the first point cloud.

In some alternative embodiments, the first point cloud may be a point cloud obtained by a decoding process performed by the decoder. For example, the first point cloud may be a point cloud with low precision obtained by the encoder by using the scale progressive encoding method. Alternatively, the operation 210 may be performed in a point cloud post-processing flow, which is not limited in the present disclosure.

In some alternative embodiments, the first point cloud may be a point cloud patch. Prior to the operation 210, a specified number of seed points may be randomly sampled from the collected point cloud, and then N nearest neighbor points of each of the specified number of seed points may be acquired, so as to obtain the first point cloud (which may be denoted as $P_{ori}$).

As an example, for each point cloud, the specified number of seed points can be randomly sampled from the point cloud by using the Monte Carlo random sampling method, and the N nearest neighbor points of each seed point are searched out, the specified number of seed points and the N nearest neighbor points of each seed point together serve as a point cloud patch$\in\mathbb{R}^{N\times 3}$.

At this time, as for the first point cloud $P_{ori} \in \mathbb{R}^{N\times 3}$, N is the number of points in the first point cloud $P_{ori}$, and 3 is a dimension of the geometry information. As an example, N may be 256 or 512 and the like, which is not limited in the present disclosure.

According to the embodiments of the present disclosure, by taking the point cloud patch as the first point cloud, the GAN is enabled to be trained based on the point cloud patch, thereby enabling the GAN to learn more detailed features, which contributes to improving the precision of the obtained point cloud.

In the embodiments of the present disclosure, the operation 210 may be performed by the feature extraction module 301. That is to say, the feature extraction module 301 may extract the first feature (which may be denoted as F) of each point in the first point cloud $P_{ori}$ input into feature extraction module. That is, the feature extraction module 301 is used to extract an expressive feature of each point in the first point cloud $P_{ori}$.

Figure 4:
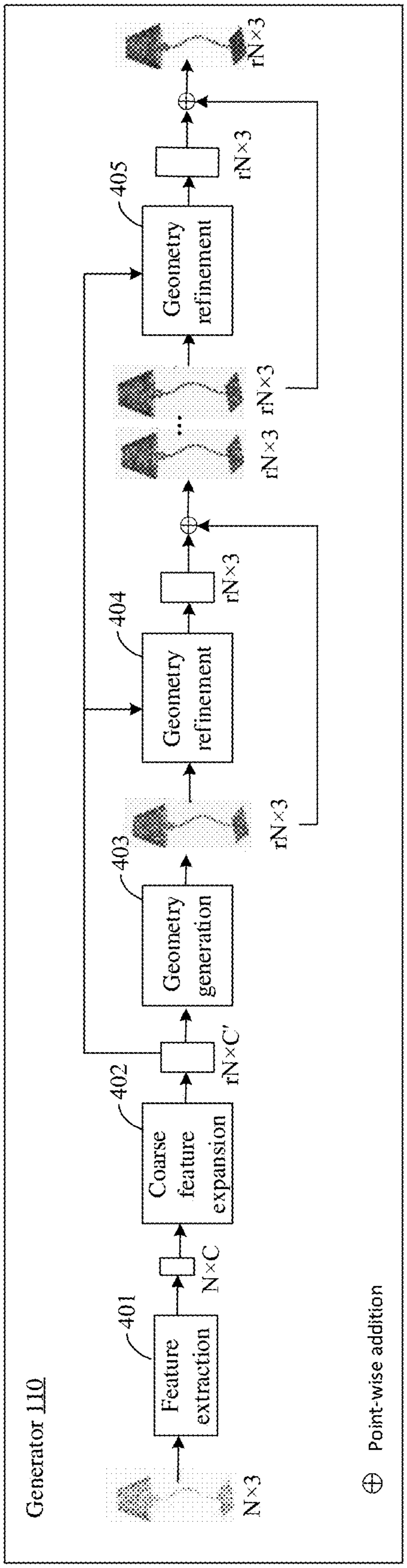
FIG. 4 is another diagram of network architecture of a generator according to an embodiment of the present disclosure.

FIG. 4 illustrates another diagram of network architecture of a generator 110. The feature extraction 401 may be an example of the feature extraction module 301 in FIG. 3. As illustrated in FIG. 4, a point cloud patch $\in \mathbb{R}^{N\times 3}$ with low resolution (e.g., a point cloud of a desk lamp) may be input into the feature extraction 401, and the feature extraction 401 outputs the first feature $F \in \mathbb{R}^{N\times C}$ of each point, where C is a feature dimension of the first feature F.

As an example, the feature extraction 401 may be a dynamic graph feature extraction network based on dense connections in a microprocessor unit (MPU), which is not limited in the present disclosure.

In the operation 220, up-sampling is performed on the first feature to obtain a second feature.

Exemplarily, the first feature may be input into a coarse feature expansion module and the up-sampling is performed on the first feature to obtain the second feature. That is, the up-sampling is performed by the coarse feature expansion module on the first feature to obtain the second feature.

The operation 220 may be performed by a coarse feature extension module 302. That is, the coarse feature extension module 302 may perform up-sampling on the first feature F acquired in the operation 210 to obtain the second feature (which may be denoted as $F_{up}$). That is, the coarse feature expansion module 302 is used to up-sample the first feature $F \in \mathbb{R}^{N\times C}$ of the expressive points extracted by the feature extraction module 301 to a coarse feature i.e., the second feature $F_{up} \in \mathbb{R}^{rN\times C'}$, where r is an up-sampling rate and C' is a feature dimension of the second feature $F_{up}$.

Continuing with reference to FIG. 4, the coarse feature extension 402 may be an example of the coarse feature extension module 302 of FIG. 3. As illustrated in FIG. 4, the first feature $F \in \mathbb{R}^{N\times C}$ of the first point cloud may be input into the coarse feature extension 402, and the coarse feature extension 402 outputs the second feature $F_{up} \in \mathbb{R}^{rN\times C'}$ of each point in the first point cloud.

As a possible implementation, the m-dimensional vector can be added to the first feature F in the feature dimension to obtain a sixth feature, and then the sixth feature is input into a first multilayer perception (MLP), and an result output by the first MLP is input into an autocorrelation attention mechanism to obtain the second feature $F_{up}$, where r is a positive integer and m is a positive integer. As an example, m can be 2.

Figure 5:
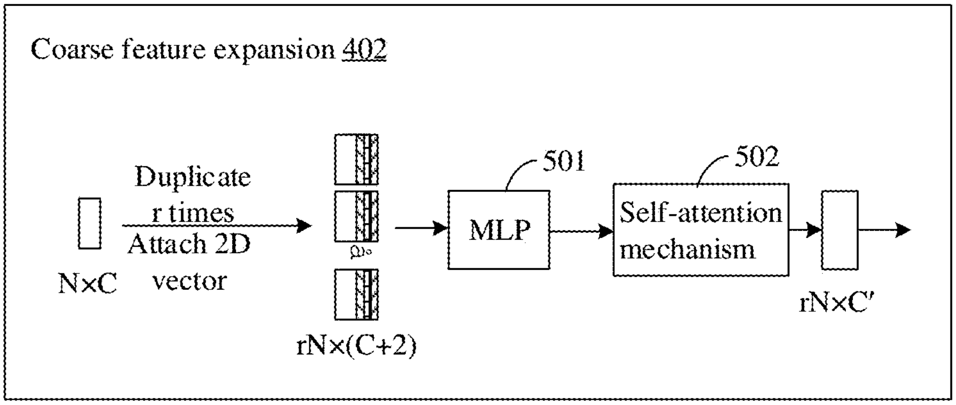
FIG. 5 is a diagram of a network framework of coarse feature expansion according to an embodiment of the present disclosure.

FIG. 5 illustrates a diagram of a network framework of coarse feature extension 402. As illustrated in FIG. 5, in the coarse feature expansion 402, the first feature $F \in \mathbb{R}^{N\times C}$ is duplicated r times at first, and then a value is assigned to each duplicated feature, and a 2-dimensional (2D) vector is attached to each duplicated feature in a feature dimension, so that there are differences among the duplicated features. The r features with differences are an example of the sixth feature.

As a specific example, values of the above-mentioned vector may be equally spaced. For example, the values of the above-mentioned vector may be equally spaced from −0.2 to 0.2. In this case, the feature dimension of each point is (C+2).

Then, the processed r features with differences may be input into the MLP 501 to extract more feature details. Thereafter, the features output from the MLP 501 may be input into an autocorrelation attention mechanism 502 to enhance the interactivity between the duplicated features, thereby obtaining the coarse up-sampled feature described above, that is, the second feature $F_{up} \in \mathbb{R}^{rN\times C'}$.

It should be noted that in FIG. 5, one MLP and one autocorrelation attention mechanism are described as examples. The embodiments of the present disclosure do not limit the number of MLPs and autocorrelation attention mechanisms. For example, the number of MLPs and autocorrelation attention mechanisms may be two or more, which are within the scope of protection of the present disclosure.

In the operation 230, the second feature is mapped from a feature space to a geometry space to obtain a second point cloud.

Exemplarily, the second feature may be input into a geometry generation module to map the second feature from the feature space to the geometry space to obtain the second point cloud. That is, the second feature can be mapped from the feature space to the geometry space through the geometry generation module to obtain the second point cloud.

The operation 230 may be performed by the geometry expansion module 303. That is, the geometry feature expansion module 303 may map the second feature $F_{up}$ obtained in the operation 220 from the feature space to the geometry space to obtain the second point cloud (which may be denoted as $P_{up\_c}$). That is, the function of the geometry generation module 303 is to remap the coarse feature (i.e., the second feature $F_{up}$) obtained by up-sampling from the feature space back to the geometry space, so as to obtain an up-sampled coarse point cloud, i.e., the second point cloud $P_{up\_c}$.

Continuing with reference to FIG. 4, the geometry generation 403 may be an example of the geometry generation module 303 of FIG. 3. As illustrated in FIG. 4, the second feature $F_{up}$ can be regressed by the geometry generation 403 to the geometric information of the up-sampled coarse point cloud, i.e., the second point cloud $P_{up\_c} \in \mathbb{R}^{rN\times 3}$, where 3 refers to a dimension of the geometry information of the second point cloud $P_{up\_c}$.

As an example, the geometry generation 403 may include 2 full connection (FC) layers. That is to say, the $F_{up}$ may be directly input into the two FC layers, and the second point cloud $P_{up\_c}$ is output.

In the operation 240, based on the second feature and the second point cloud, an offset value of a point in the second point cloud in the geometry space is determined.

Exemplarily, each second feature and the second point cloud may be input into a geometry offset prediction module to determine an offset value of the point in the second point cloud in the geometry space.

The operation 240 may be performed by the geometry offset prediction module 304. That is, based on the second point cloud $P_{up\_c}$ obtained in the operation 230 and the second feature $F_{up}$ obtained in the operation 220, the geometry offset prediction module 304 may obtain an offset value (which may be denoted as ΔO) of each of points in the second point cloud $P_{up\_c}$ in the geometric space.

In the operation 250, a third point cloud is determined based on the second point cloud and the offset value.

As an example, the second point cloud $P_{up\_c}$ may be corrected based on the offset value ΔO of each point in the second point cloud $P_{up\_c}$ in the geometry space determined by the geometric offset prediction module 304 in the operation 240, so that the second point cloud $P_{up\_c}$ approaches an up-sampled point cloud distribution closer to the ground truth, so as to obtain the third point cloud (which may be denoted as $P_{up}$) closer to the ground truth.

Continuing with reference to FIG. 4, the geometry refinement 404 and geometry refinement 405 may be examples of the geometry offset prediction module 304 of FIG. 3. As illustrated in FIG. 4, the second point cloud $P_{up\_c} \in \mathbb{R}^{rN\times3}$ generated by the geometry generation 403 and the second feature $F_{up} \in \mathbb{R}^{rN\times C'}$ of each point obtained through the up-sampling performed by the coarse feature expansion 402 may be input into the geometry refinement 404, and the geometry refinement 404 outputs an offset value ΔO of each point in the geometry space; then, the second point cloud $P_{up\_c}$ and ΔO are added to obtain an up-sampled point cloud subjected to one time of correction. Similarly, the up-sampled point cloud subjected to the correction and the second feature $F_{up} \in \mathbb{R}^{rN\times C'}$ of each point may continue to be input into the geometry refinement 405, and the point cloud is further corrected by the geometry refinement 405.

As illustrated in FIG. 4, at least one geometry refinement may be included in the geometry offset prediction module. According to the embodiments of the present disclosure, when the number of geometry refinements is multiple, $P_{up\_c}$ can be corrected continuously for multiple times in a progressive manner, and after the processing of the last geometry refinement, a final up-sampled point cloud, that is, a third point cloud $P_{up} \in \mathbb{R}^{rN\times3}$, can be obtained. By way of example, the number of geometry refinements may be 2, 3, 4 or others, which is not limited in the present disclosure.

In the embodiment of the present disclosure, since the geometry generation module 203 only generates a coarse up-sampled point cloud patch $P_{up\_c} \in \mathbb{R}^{rN\times3}$, the precision of $P_{up\_c}$ is not high. According to the embodiments of the present disclosure, the geometry refinement predicts the offset value ΔO of each point in $P_{up\_c}$ in the geometry space, and preforms one or more times of corrections on $P_{up\_c}$ based on the offset value ΔO, so that $P_{up\_c}$ approaches the distribution of the up-sampled point cloud that is closer to the ground truth, and thus the precision of the up-sampled point cloud is improved.

As a possible implementation, k nearest neighbor points of the second feature $F_{up}$ in the feature space can be obtained, k nearest neighbor points of a point in the second point cloud $P_{up\_c}$ in the geometry space can be obtained, the second feature and the k nearest neighbor points of the second feature in the feature space are concatenated in the feature dimension to obtain a third feature; and the point in the second point cloud and the k nearest neighbor points of the point in the second point cloud in the geometry space are concatenated in the geometry dimension to obtain a fourth feature, where k is a positive integer, such as 8, 16, 24, 32, and the like, which is not limited in the present disclosure.

Then, an offset value of each point in the second point cloud in the geometry space can be determined based on the third feature and the fourth feature.

As an implementation, the third feature and the fourth feature can be concatenated in the feature dimension to obtain a fifth feature, the fifth feature is input as a query value Q and a key value K into the first autocorrelation attention mechanism, and the fourth feature is input as a value vector V into the first autocorrelation attention mechanism, so as to obtain the offset value of the point in the second point cloud in the geometry space.

Figure 6:
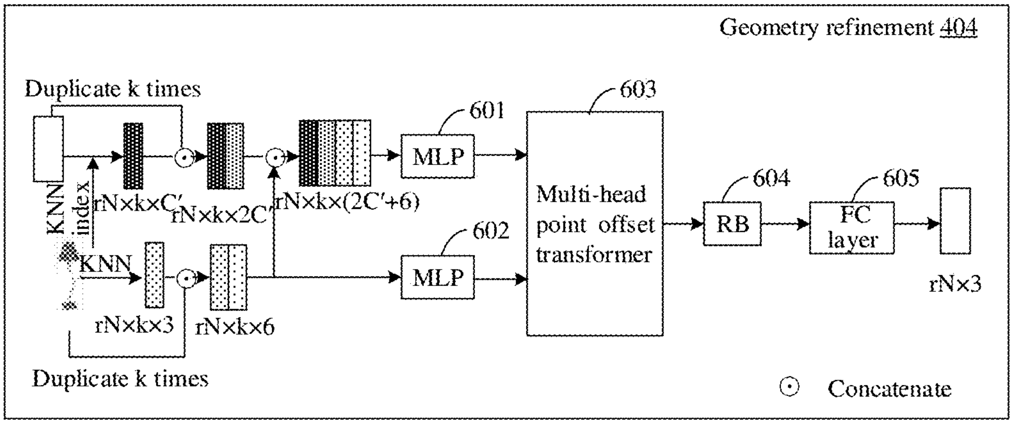
FIG. 6 is a diagram of a network framework of geometry refinement according to an embodiment of the present disclosure.

FIG. 6 illustrates a diagram of a network framework of geometry refinement 404. As illustrated in FIG. 6, in the geometry refinement 404, a coarse point cloud (i.e., a second point cloud $P_{up\_c}$) and a coarse up-sampled feature (i.e., a second feature $F_{up}$) may be used as input of the geometry refinement 404. Then, k-nearest neighbor (KNN) search algorithm can be used to obtain k nearest neighbor points of each point in the second point cloud $P_{up\_c}$ in the geometry space. At the same time, k-nearest neighbor search algorithm can be used to find k nearest neighbor points of the second feature $F_{up}$ in the feature space by using the same KNN index as the second point cloud. Then, the second feature $F_{up}$ is duplicated k times, and the second feature $F_{up}$ and k nearest neighbor points corresponding to the second feature $f_{up}$ can be concatenated in the feature dimension to obtain a third feature, which is denoted as $F_{feature} \in \mathbb{R}^{rN\times k\times 2C'}$, each point in the second point cloud $P_{up\_c}$ is duplicated k times and each point in the second point cloud $P_{up\_c}$ and k nearest neighbor points corresponding to the point are concatenated in the geometry dimension to obtain a fourth feature, which is denoted as $F_{xyz} \in \mathbb{R}^{rN\times k\times 6}$.

Then, the offset value ΔO can be determined based on the third feature $F_{feature} \in \mathbb{R}^{rN\times k\times 2C'}$ and the fourth feature $F_{xyz} \in \mathbb{R}^{rN\times k\times(2C'+6)}$.

Continuing with reference to FIG. 6, as a possible implementation, in order to obtain more expressive features, $F_{xyz}$ and $F_{feature}$ can be further concatenated to obtain a global feature, that is, the fifth feature, which is denoted as $F_{global} \in \mathbb{R}^{rN\times k\times(2C'+6)}$. Then, the offset value ΔO can be obtained based on the fourth feature $F_{xyz}$ and the fifth feature $F_{global}$ and by using the self-attention mechanism.

As an example, a multi-head point offset transformer can be used as the self-attention mechanism to efficiently predict features of a geometry offset of each point in the point cloud in the space, so as to obtain a geometry offset value ΔO of each point in the point cloud.

Figure 7:
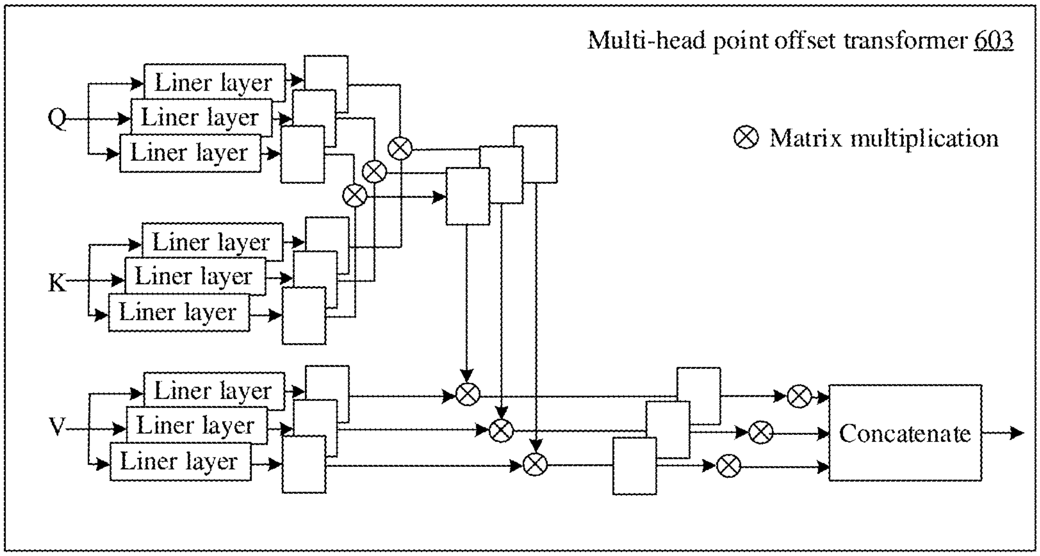
FIG. 7 is a diagram of network architecture of a multi-head point offset transformer according to an embodiment of the present disclosure.

FIG. 7 illustrates a diagram of network architecture of a multi-head point offset transformer 603. As illustrated in FIG. 7, the fifth feature $F_{global}$ may be input as a query value Q and a key value K into the multi-head point offset transformer 603, and the fourth feature $F_{xyz}$ may be input as a value vector V into the multi-head point offset transformer 603. The fourth feature $F_{xyz}$ and the fifth feature $F_{global}$ will be processed by the network architecture illustrated in FIG. 7.

Continuing with reference to FIG. 6, the output of the multi-head point offset transformer 603 may be input into a residual block (RB) 604 and an FC layer 605 to obtain a geometry offset ΔO for each point in the final point cloud. As an example, the RB 604 may include five layers of RB, each layer of RB consisting of three linear layers and rectified linear units (ReLU), which is not limited in the present disclosure. As an example, the FC layer 605 may include two FC layers, which is not limited in the present disclosure.

Continuing with reference to FIG. 4, after obtaining the geometry offset value ΔO of each point in the second point cloud, each point in the second point cloud $P_{up\_c}$ can be added with the geometry offset value corresponding to the point, so as to obtain an up-sampled point cloud subjected to the correction. As an example, the final up-sampled point cloud, i.e., the third point cloud patch $P_{up} \in \mathbb{R}^{rN\times 3}$, can be obtained by applying three times of geometry refinement continuously in a progressive manner.

Therefore, in the embodiments of the present disclosure, in the generator, after the feature extraction module performs feature extraction on the point of the first point cloud that is input into the feature extraction module, the first feature can be up-sampled by the coarse feature expansion module to obtain the second feature, the second feature is mapped to the geometry space by the geometry generation module to obtain the up-sampled second point cloud, and then, the second feature and the second point cloud are input into the geometry offset prediction module to determine an offset value of a point in the second point cloud in the geometry space, and the third point cloud is obtained by correcting the second point cloud based on the offset value. According to the embodiments of the present disclosure, by correcting the up-sampled second point cloud, the distribution of a point cloud obtained by up-sampling is made to be closer to the ground truth, which contributes to improving precision of the point cloud.

In some alternative embodiments, the third point cloud may also be input into the discriminator to obtain a confidence value of points in the third point cloud. The confidence value is used to indicate whether the third point cloud is the ground truth. The confidence value can be used to update parameters of the generator.

Exemplarily, the discriminator 120 may discriminate whether the input point cloud is from the output of the generator or the ground truth such that the generator produces an up-sampled point cloud closer to the ground truth. For example, when the confidence value is close to 0, the input point cloud corresponds to the output of the generator; and when the confidence value is close to 1, the input point cloud corresponds to the ground truth. Based on the confidence value, the parameters of the generator 110 can be updated.

In some embodiments, prior to the operation 210, the GAN may be trained. For example, a training point cloud is input into the generator, and an up-sampled training point cloud is obtained. The up-sampled training point cloud is then input into the discriminator, and the parameters of the generator are updated by the confidence value output by the discriminator. Specifically, for the process of up-sampling, by the generator, the input training point cloud to obtain the up-sampled point cloud, and obtaining, by the discriminator, the confidence value of the up-sampled point cloud, descriptions on the generator and the discriminator can be referred to and will not be repeated here.

As a possible implementation, the third point cloud may be used as a training sample and input into at least two consecutive MLP layers (an example of the second MLP layer). The at least two consecutive MLP layers are used to extract features of the third point cloud $P_{up}$. Then, a maximum pool operation is performed on a feature output by the last MLP layer of the at least two consecutive MLP layers to obtain a global feature vector of the third point cloud. Thereafter, the global feature vector can be concatenated with the features output by the at least two successive ML layers to determine a concatenated feature, the concatenated feature can be input into a third autocorrelation attention mechanism, and a output result of the third autocorrelation attention mechanism can be input into the FC layer to determine the confidence value.

Figure 8:
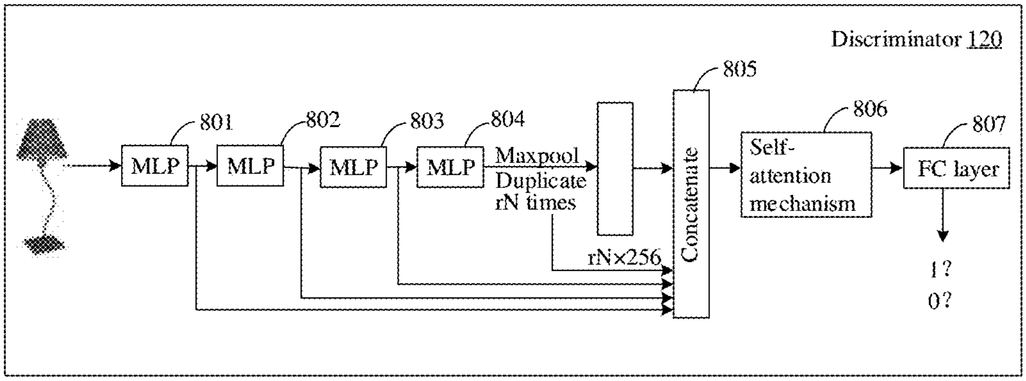
FIG. 8 is a diagram of network architecture of a discriminator according to an embodiment of the present disclosure.

FIG. 8 illustrates a diagram of network architecture of a discriminator 120 according to an embodiment of the present disclosure. As illustrated in FIG. 8, four consecutive MLP layers, namely MLP 801 to MLP 804 can first be used to extract the features of different layers of the third point cloud $P_{up}$, and then the output of the last MLP layer, namely MLP 804, can be subjected to a maximum pool operation to obtain a global feature vector. Then, the global feature vector can be duplicated, and the duplicated global feature vectors can be concatenated with the features output from the MLP 801 to MLP 804 layers. The concatenated feature may then be input into an autocorrelation attention mechanism 806 to enhance feature interaction between each point. Finally, the result output by the autocorrelation attention mechanism 806 is input into the FC layer 807 to obtain the confidence value of each point.

In the embodiments of the present disclosure, by using multiple continuous MLP layers to perform feature extraction of different layers and concatenating the multilayer of features, the network can learn the features of each layer while learning the global feature vector, thereby contributing to increasing the discrimination ability of the network and further improving the discrimination effect of the network.

It should be noted that in FIG. 8, four consecutive MLP layers are described as an example, but the embodiments of the present disclosure are not limited thereto. For example, the number of MLP layers may be other, such as two, three or five. Additionally, as an example, the FC layer 807 may include multiple (e.g., 2 3 or other) FC layers, which is not limited in the present disclosure.

In the embodiments of the present disclosure, the parameters of the GAN can be optimized and updated based on a Loss function. In some alternative embodiments, the loss function may be determined from an adversarial loss function, a reconstructed loss function, and a uniform loss function.

For the adversarial loss function, a least square loss function can be used to train the generator and discriminator. Exemplarily, the adversarial loss functions of the generator G and the discriminator D are illustrated by the following formulas (1) and (2), respectively:

$$L_{gen}(P_{up}) = \frac{1}{2}(D(P_{up}) - 1)^2 \tag{1}$$

$$L_{dis}(P_{up}, P_T) = \frac{1}{2}\left((D(P_{up})^2\ (D(P_T) - 1)^2\right) \tag{2}$$

where $L_{gen}(P_{up})$ represents the adversarial loss function of the generator, $L_{dis}(P_{up}, P_T)$ represents the adversarial loss function of the discriminator, $P_{up}$ refers to the point cloud patch generated by the generator, $P_T$ is the point cloud patch of the ground truth with the same number of points as $P_{up}$, $D(P_{up})$ represents the confidence value output by the discriminator D when $P_{up}$ is input into D, and $D(P_T)$ represents the confidence value output by D when $P_T$ is input into D.

For the reconstruction loss function, the reconstruction loss function is used to make the reconstructed point cloud have the same geometry distribution as the ground truth. As an example, the chamfer distance (CD) can be used as the reconstruction loss function $L_{rec}$, which can be illustrated by the following formula (3):

$$L_{rec} = CD(P_{up}, P_T) = \frac{1}{N}\left(\sum_{p\in P_{up}} \min_{q\in, P_T} \|p - q\|_2^2 + \sum_{q\in P_T} \min_{p\in P_{up}} \|q - p\|_2^2\right) \tag{3}$$

where p and q are arbitrary points in $P_{up}$ and $P_T$, and N refers to the number of points in $P_{up}$.

In order to make multiple coarse point clouds $P_{up\_c}$ generated during the reconstruction process closer to the surface of the ground truth point cloud. According to the embodiments of the present disclosure, a coarse reconstruction loss function $L_{coarse}$ is proposed:

$$L_{coarse} = \sum_{i=1}^{M} w_i CD(P_{up\_c\_i}, P_T) \tag{4}$$

where M is the number of coarse point clouds, and $w_i$ refers to the i-th weight.

For the uniform loss function, the uniform loss function is used to make the generator produce a point cloud that has a more uniform distribution in the space. As an example, the uniform loss function $L_{uni}$ can be illustrated by the following formula (5):

$$L_{uni} = \sum_{i=1}^{T} U_{imblance}(S_i) \cdot U_{cluster}(S_i) \tag{5}$$

where $$U_{imbalance}(S_i) = \frac{(|S_i| - \hat{n})^2}{\hat{n}},\ U_{cluster}(S_i) = \sum_{j}^{|S_i|} \frac{(d_{i,j} - \hat{d})^2}{\hat{d}},$$

$S_i$ refers to the local surface i obtained by radius sphere (radius being $r_q$) method, and T is the number of seed points obtained by farthest point sampling (FPS), $d_{i,j}$ represents a distance between the j-th point and the nearest neighbor point of the j-th point in the i-th local surface, $\hat{n}$ is the desired number of points contained in each local surface, and $\hat{d}$ is the desired spatial distance between each point and nearest neighbor point of the point in the local surface.

Based on the above description, the final loss function of the embodiments of the present disclosure can be illustrated by the following formulas (6) and (7):

$$L_G = w_{gen} L_{gen}(P_{up}) + w_{rec} L_{rec} + L_{coarse} + w_{uni} L_{uni} \tag{6}$$

$$L_D = w_{dis} L_{dis}(P_{up}, P_T) \tag{7}$$

where $L_G$ represents the loss function of the generator, $L_D$ represents the loss function of the discriminator, $w_{gen}$ refers to the weight of the loss function of the generator, $w_{rec}$ refers to the weight of the loss function of the reconstruction, $w_{uni}$ refers to the weight of the loss function of uniformity, and $w_{dis}$ refers to the weight of the loss function of the discriminator. Exemplarily, $w_{gen}$, $w_{rec}$, $w_{uni}$ and $w_{dis}$ may be respectively set as 1, 3900, 10 and 1, which are not limited in the present disclosure.

The point cloud processing method according to the embodiments of the present disclosure can be implemented on TensorFlow 1.15.0. In Table 1, the performance of the point cloud obtained by the point cloud processing method (i.e., PU-Refiner) of the embodiments of the present disclosure and the performance of the point cloud obtained by other point cloud up-sampling methods are compared. As an example, the degree of similarity between the generated point cloud and the ground truth can be measured by using chamfer distance (CD), Hausdorff distance (HD), point to face distance (P2FD), or uniformity, respectively. In the embodiments of the present disclosure, the up-sampling rate r can be set to 4. From the experimental data in Table 1, it can be seen that the point cloud processing method of the embodiments of the present disclosure can significantly improve the up-sampling performance and improve precision of the point cloud.

TABLE 1

| Method | CD ($10^{-3}$) | HD ($10^{-3}$) | P2FD ($10^{-3}$) | Uniformity ($10^{-3}$) |
|---|---|---|---|---|
| EAR[5] | 0.87 | 10.33 | 7.79 | 28.62 |
| PU-Net[6] | 0.53 | 5.95 | 13.23 | 974.19 |
| MPU[8] | 0.44 | 5.32 | 3.07 | 13.15 |
| PUGeo[10] | 0.43 | 5.17 | 1.99 | 15.76 |
| PU-GAN[9] | 0.29 | 4.42 | 2.94 | 3.98 |
| PU-Refiner | 0.27 | 3.87 | 2.48 | 3.17 |

The method embodiments of the present disclosure are described in detail with reference to FIGS. 1 to 8 and the apparatus embodiments of the present disclosure will be described in detail below with reference to FIGS. 9 to 10.

Figure 9:
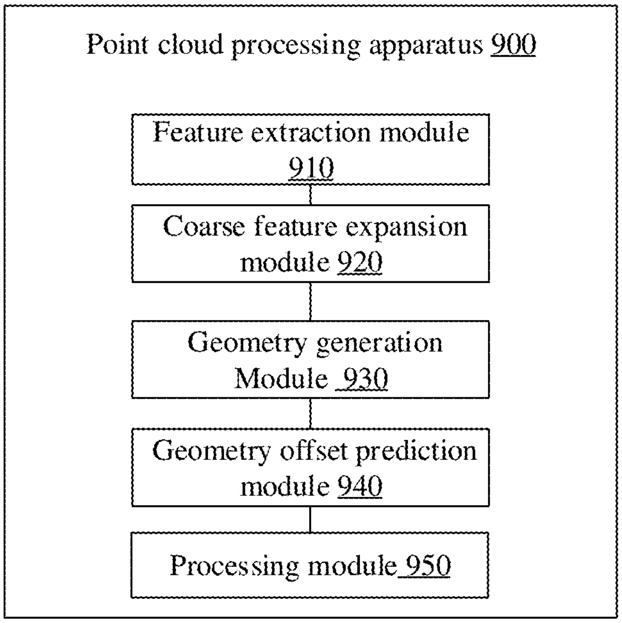
FIG. 9 is a block diagram of a point cloud processing apparatus according to an embodiment of the present disclosure.

FIG. 9 is a schematic block diagram of a point cloud processing apparatus 900 according to an embodiment of the present disclosure. The point cloud processing apparatus 900 is a decoder. As illustrated in FIG. 9, the point cloud processing apparatus 900 may include a feature extraction module 910, a coarse feature expansion module 920, a geometry generation module 930, a geometry offset prediction module 940 and a processing unit 950.

The feature extraction module 910 is configured to perform feature extraction on a first point cloud input into the feature extraction module, to obtain a first feature of a point of the first point cloud.

The coarse feature expansion module 920 is configured to up-sample the first feature input into the coarse feature expansion module, to obtain a second feature.

The geometry generation module 930 is configured to map the second feature input into the geometry generation module from a feature space to a geometry space, to obtain a second point cloud.

The geometry offset prediction module 940 is configured to determine an offset value of a point in the second point cloud in the geometry space after the second feature and the second point cloud are input into the geometry offset prediction module 940.

The processing module 950 is configured to obtain a third point cloud based on the second point cloud and the offset value.

In some alternative embodiments, the geometry offset prediction module 940 is specifically configured to perform the following operations.

The k nearest neighbor points of the point in the second point cloud in the geometry space are determined, where k is a positive integer.

The k nearest neighbor points of the second feature in the feature space are determined.

The second feature and the k nearest neighbor points of the second feature in the feature space are concatenated in a feature dimension to obtain a third feature.

The point in the second point cloud and the k nearest neighbor points of the point in the second point cloud in the geometry space are concatenated in a geometry dimension to obtain a fourth feature.

Based on the third feature and the fourth feature, the offset value of the point in the second point cloud in the geometry space is determined.

In some alternative embodiments, the geometry offset prediction module 940 is specifically configured to perform the following operations.

The third feature and the fourth feature are concatenated in the feature dimension to obtain a fifth feature.

The offset value of the point in the second point cloud in the geometry space is obtained by inputting the fifth feature as a query value Q and a key value K into a first autocorrelation attention mechanism, and inputting the fourth feature as a value vector V into the first autocorrelation attention mechanism.

In some alternative embodiments, the first autocorrelation attention mechanism is a multi-head autocorrelation attention mechanism.

In some alternative embodiments, the coarse feature expansion module 920 is specifically configured to perform the following operations.

A sixth feature is obtained by attaching, in a feature dimension, an m-dimensional vector to the first feature, where m is a positive integer.

The second feature is obtained by inputting the sixth feature into a first multilayer perceptron (MLP), and inputting a result output by the first MLP into a second autocorrelation attention mechanism.

In some alternative embodiments, vector values of the m-dimensional vector are equally spaced.

In some alternative embodiments, the m-dimensional vector is a 2-dimensional vector.

In some alternative embodiments, the geometry generation module 930 is specifically configured to perform the following operation.

The second point cloud is obtained by inputting the second feature into a first full connection (FC) layer.

In some alternative embodiments, the apparatus 900 further includes a discrimination module, configured to obtain a confidence value of a point in the third point cloud after the third point cloud is input into the discrimination module. The confidence value indicates whether the third point cloud is the ground truth.

In some alternative embodiments, the discrimination module is specifically configured to perform the following operation.

The third point cloud is input into at least two consecutive second multilayer perceptron (MLP) layers.

A global feature vector of the third feature is obtained by performing a maximum pool operation on a feature output by a last second MLP layer in the at least two consecutive second MLP layers.

A concatenated feature is determined by concatenating the global feature vector and features output by the at least two consecutive second MLP layers.

The confidence value is obtained by inputting the concatenated feature into a third autocorrelation attention mechanism, and inputting a result output by the third autocorrelation attention mechanism into a second full connection (FC) layer.

In some alternative embodiments, the first point cloud is a point cloud obtained by a decoder through a decoding process.

It should be understood that apparatus embodiments and method embodiments may correspond to each other and reference may be made to the similar descriptions in the method embodiments, which will not be repeated here to avoid repetition. Specifically, the point cloud processing apparatus 900 illustrated in FIG. 9 may correspond to a corresponding entity in the method 200 for performing the embodiments of the present disclosure, and the foregoing and other operations and/or functions of the respective modules in the apparatus 900, which are used to implement various flows in the various methods in FIG. 2, are not repeated here for the sake of brevity.

The apparatus and the system of the embodiments of the present disclosure are described above from the perspective of functional modules with reference to the accompanying drawings. It should be understood that the functional modules may be implemented in hardware form, by instructions in software form, or by a combination of hardware and software modules. In particular, various operations of the method embodiments in the embodiments of the present disclosure can be completed by the integrated logic circuit of the hardware in the processor and/or by the instruction in the form of software. The operations of the method disclosed in the embodiments of the disclosure may be directly embodied as being executed and completed by a hardware decoding processor, or executed and completed by a combination of hardware and software modules in the decoding processor. Alternatively, the software module may be located in a mature storage medium in the field such as a random access memory, a flash memory, a read-only memory, a programmable read-only memory, or an electrically erasable programmable memory or a register. The storage medium is located in the memory, and the processor reads the information in the memory and completes the operations of the above-mentioned method in combination with its hardware.

Figure 10:
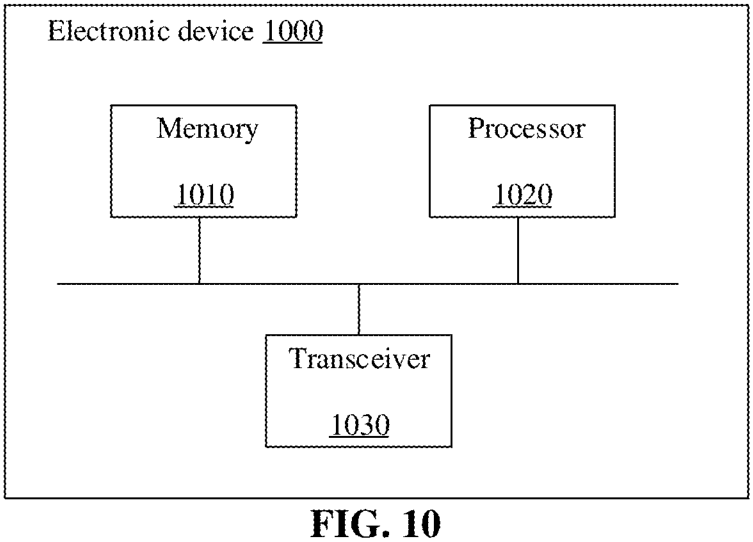
FIG. 10 is a block diagram of an electronic device according to an embodiment of the present disclosure.

FIG. 10 is a schematic block diagram of an electronic device 1000 according to an embodiment of the present disclosure.

As illustrated in FIG. 10, the electronic device 1000 may include a memory 1010 and a processor 1020.

The memory 1010 stores a computer program and transmits the program code to the processor 1020. In other words, the processor 1020 may invoke and run the computer program from the memory 1010 to implement the point cloud processing method in the embodiments of the present disclosure.

For example, the processor 1020 may be operable to perform the operations in the method 200 described above in accordance with instructions in the computer program.

In some embodiments of the present disclosure, the processor 1020 may include, but is not limited to: a general purpose processor, a digital signal processor (DSP), an application specific integrated circuit (ASIC), a field programmable gate array (FPGA), other programmable logic device, a discrete gate or a transistor logic device, or a discrete hardware component and so on.

In some embodiments of the present disclosure, the memory 1010 includes, but is not limited to, a volatile memory and/or a nonvolatile memory.

The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of exemplary but not restrictive description, many forms of RAM are available, such as static RAMs (SRAM), dynamic RAMS (DRAM), synchronous DRAMs (SDRAM), double data rate SDRAMs (DDR SDRAM), enhanced SDRAMs (ESDRAM), synch link DRAMs (SLDRAM)) and direct rambus RAMs (DR RAM).

In some embodiments of the present disclosure, the computer program may be divided into one or more modules that are stored in the memory 1010 and executed by the processor 1020 to complete the point cloud processing method provided in the present disclosure. The one or more modules may be a series of computer program instruction segments capable of performing particular function(s) that describe the execution process of the computer program in the electronic device 1000.

Alternatively, as illustrated in FIG. 10, the electronic device 1000 may further include a transceiver 1030.

The transceiver 1030 may be connected to the processor 1020 or the memory 1010.

The processor 1020 may control the transceiver 1030 to communicate with other devices and in particular may transmit information or data to other devices or receive information or data transmitted by other devices. The transceiver 1030 may include a transmitter and a receiver. The transceiver 1030 may further include one or more antennas.

It should be understood that various components in the electronic device 1000 are connected by a bus system. The bus system includes, in addition to a data bus, a power bus, a control bus and a status signal bus.

According to an aspect of the present disclosure, there is provided a decoder which includes a processor and a memory. The memory is for storing a computer program and the processor is configured to invoke and run the computer program stored in the memory to cause the decoder to perform the method of the method embodiments described above.

According to an aspect of the present disclosure, there is provided a computer storage medium having stored thereon a computer program that, when executed by a computer, causes the computer to perform the method of the method embodiments described above. Alternatively, an embodiment of the present disclosure further provides a computer program product including instructions that, when executed by a computer, cause the computer to perform the method of the method embodiments described above.

According to another aspect of the present disclosure, there is provided a computer program product or a computer program which includes computer instructions stored in a computer-readable storage medium. A processor of a computer device reads the computer instructions from the computer-readable storage medium, and the processor executes the computer instructions to cause the computer device to perform the method of the method embodiments described above.

In other words, when the method is implemented in software, it can also be implemented in whole or in part in the form of a computer program product. The computer program product includes one or more computer instructions. When the computer program instructions are loaded and executed on a computer, the flow or function described in accordance with the embodiments of the present disclosure is generated in whole or in part. The computer may be a general purpose computer, a special purpose computer, a computer network, or other programmable apparatuses. The computer program instructions may be stored in the above-mentioned computer-readable storage medium or transmitted from one computer-readable storage medium to another. For example, the computer instructions may be transmitted from one website site, computer, server or data center to another website site, computer, server or data center via wired (e.g., coaxial cable, optical fiber, digital subscriber line (DSL)) or wireless (e.g., infrared, wireless, microwave, etc.). The computer-readable storage medium may be any usable medium accessible to a computer or a data storage device such as a data center or a server containing one or more usable media integration, etc. The usable media may be magnetic media (e.g., floppy disk, hard disk, magnetic tape), optical media (e.g., digital video disc (DVD)), or semiconductor media (e.g., solid state disk (SSD)), etc.

Those of ordinary skill in the art will appreciate that the various example modules and algorithm operations described in connection with the embodiments disclosed herein can be implemented in electronic hardware or in a combination of computer software and electronic hardware. Whether these functions are performed in hardware or software depends on the specific application and design constraints of the technical solutions. Those skilled in the art may use different methods for each particular application to implement the described functionality, but such implementation should not be considered beyond the scope of the present disclosure.

In the several embodiments provided by the disclosure, it should be understood that the disclosed system, apparatus and method may be implemented in other ways. For example, the apparatus embodiments described above are only illustrative. For example, the division of the modules is only the division of logical functions, and there may be other divisions in actual implementation. For example, multiple modules or components may be combined or integrated into another system, or some features may be ignored or not implemented. In addition, the presented or discussed mutual coupling or direct coupling or communication connection may be indirect coupling or communication connection through some interfaces, apparatuses or modules, and may be in electrical, mechanical or other forms.

The modules described as separate components may or may not be physically separate, and the components represented as modules may or may not be physical modules, that is, the modules may be located in one place, or may be distributed to multiple network units. Some or all of the modules may be selected according to actual needs to achieve the objective of the solution of the present embodiment. For example, the functional modules in various embodiments of the present disclosure may be integrated in one processing module, each module may be physically present individually, or two or more modules may be integrated into one unit.

In summary, the foregoing is merely a detailed description of the present disclosure, but the scope of protection of the present disclosure is not limited thereto. Any person skilled in the art can readily conceive of changes or substitutions within the technical scope disclosed in the present disclosure, and all of the changes or substitutions should be covered by the scope of protection of the present disclosure. Therefore, the scope of protection of the present disclosure should be defined by the scope of protection of the claims.

The invention claimed is:

1. A point cloud processing method for improving point cloud resolution based on a generative adversarial network (GAN), wherein the GAN comprises a generator, wherein the generator comprises a feature extraction network, a coarse feature expansion network, a geometry generation network and a geometry offset prediction network, the method is performed by a computer device including a processor, and the method comprises:

inputting, through the processor, a first point cloud into the feature extraction network to obtain a first feature of a point of the first point cloud;

inputting, through the processor, the first feature into the coarse feature expansion network to perform up-sampling on the first feature to obtain a second feature;

inputting, through the processor, the second feature into the geometry generation network to map the second feature from a feature space to a geometry space to obtain a second point cloud;

inputting, through the processor, the second feature and the second point cloud into the geometry offset prediction network to determine an offset value of a point in the second point cloud in the geometry space, the offset value being used for correcting the second point cloud; and obtaining, through the processor, a third point cloud based on the second point cloud and the offset value, the third point cloud having a higher resolution than the first point cloud, wherein the GAN further comprises a discriminator, and the method further comprises:

inputting, through the processor, the third point cloud into the discriminator to obtain a confidence value of a point in the third point cloud, wherein the confidence value indicates whether the third point cloud is ground truth, wherein inputting, through the processor, the third point cloud into the discriminator to obtain the confidence value of the point in the third point cloud comprises:

inputting, through the processor, the third point cloud into at least two consecutive second multilayer perceptron (MLP) layers;

performing, through the processor, a maximum pool operation on a feature output by a last second MLP layer in the at least two consecutive second MLP layers to obtain a global feature vector of a third feature;

concatenating, through the processor, the global feature vector and features output by the at least two consecutive second MLP layers to determine a concatenated feature; and inputting, through the processor, the concatenated feature into a third autocorrelation attention mechanism, and inputting a result output by the third autocorrelation attention mechanism into a second full connection (FC) layer to obtain the confidence value.

2. The method of claim 1, wherein inputting, through the processor, the second feature and the second point cloud into the geometry offset prediction network to determine the offset value of the point in the second point cloud in the geometry space comprises:

determining, through the processor, k nearest neighbor points of the point in the second point cloud in the geometry space, where k is a positive integer;

determining, through the processor, k nearest neighbor points of the second feature in the feature space;

concatenating, through the processor, in a feature dimension, the second feature and the k nearest neighbor points of the second feature in the feature space, to obtain a third feature;

concatenating, through the processor, in a geometry dimension, the point in the second point cloud and the k nearest neighbor points of the point in the second point cloud in the geometry space, to obtain a fourth feature; and determining, through the processor, based on the third feature and the fourth feature, the offset value of the point in the second point cloud in the geometry space.

3. The method of claim 2, wherein determining, through the processor, based on the third feature and the fourth feature, the offset value of the point in the second point cloud in the geometry space comprises:

concatenating, through the processor, in the feature dimension, the third feature and the fourth feature to obtain a fifth feature; and inputting, through the processor, the fifth feature as a query value Q and a key value K into a first autocorrelation attention mechanism, and inputting the fourth feature as a value vector V into the first autocorrelation attention mechanism, to obtain the offset value of the point in the second point cloud in the geometry space.

4. The method of claim 3, wherein the first autocorrelation attention mechanism is a multi-head autocorrelation attention mechanism.

5. The method of any claim 1, wherein performing, by the coarse feature expansion network, up-sampling on the first feature to obtain the second feature comprises:

attaching, through the processor, in a feature dimension, an m-dimensional vector to the first feature, to obtain a sixth feature, where m is a positive integer; and inputting, through the processor, the sixth feature into a first multilayer perceptron (MLP), and inputting a result output by the first MLP into a second autocorrelation attention mechanism, to obtain the second feature.

6. The method of claim 5, wherein vector values of the m-dimensional vector are equally spaced.

7. The method of claim 5, wherein the m-dimensional vector is a 2-dimensional vector.

8. The method of claim 1, wherein mapping, by the geometry generation network, the second feature from the feature space to the geometry space to obtain the second point cloud comprises:

inputting, through the processor, the second feature into a first full connection (FC) layer to obtain the second point cloud.

9. A non-transitory computer-readable storage medium for storing a computer program which, when executed by a computer, cause the computer to perform the method of claim 1.

10. A decoder for improving point cloud resolution based on a generative adversarial network (GAN), wherein the decoder comprises processor, and a memory for storing a computer program, the GAN comprises a generator, the generator comprises a feature extraction network, a coarse feature expansion network, a geometry generation network, a geometry offset prediction network and a processing unit, and the processor is configured to invoke and run the computer program to implement:

the feature extraction network configured to perform feature extraction on a first point cloud input into the feature extraction network, to obtain a first feature of a point of the first point cloud;

the coarse feature expansion network configured to upsample the first feature input into the coarse feature expansion network, to obtain a second feature;

the geometry generation network configured to map the second feature input into the geometry generation network from a feature space to a geometry space, to obtain a second point cloud;

the geometry offset prediction network configured to determine an offset value of a point in the second point cloud in the geometry space based on the second feature and the second point cloud input into the geometry offset prediction network, the offset value being used for correcting the second point cloud; and the processing unit configured to obtain a third point cloud based on the second point cloud and the offset value, the third point cloud having a higher resolution than the first point cloud, wherein the GAN further comprises a discriminator, and the processor is configured to invoke and run the computer program to implement the discriminator to:

determine a confidence value of a point in the third point cloud based on the third point cloud inputted into the discriminator, wherein the confidence value indicates whether the third point cloud is ground truth, wherein determine the confidence value comprises:

inputting the third point cloud into at least two consecutive second multilayer perceptron (MLP) layers;

performing a maximum pool operation on a feature output by a last second MLP layer in the at least two consecutive second MLP layers to obtain a global feature vector of a third feature;

concatenating the global feature vector and features output by the at least two consecutive second MLP layers to determine a concatenated feature; and inputting the concatenated feature into a third autocorrelation attention mechanism, and input a result output by the third autocorrelation attention mechanism into a second full connection (FC) layer to obtain the confidence value.

11. The decoder of claim 10, wherein the processor is specifically configured to implement the geometry offset prediction network to:

determine k nearest neighbor points of the point in the second point cloud in the geometry space, where k is a positive integer;

determine k nearest neighbor points of the second feature in the feature space;

concatenate, in a feature dimension, the second feature and the k nearest neighbor points of the second feature in the feature space, to obtain a third feature;

concatenate, in a geometry dimension, the point in the second point cloud and the k nearest neighbor points of the point in the second point cloud in the geometry space, to obtain a fourth feature; and determine, based on the third feature and the fourth feature, the offset value of the point in the second point cloud in the geometry space.

12. The decoder of claim 11, wherein the processor is specifically configured to implement the geometry offset prediction network to:

concatenate, in the feature dimension, the third feature and the fourth feature to obtain a fifth feature; and input the fifth feature as a query value Q and a key value K into a first autocorrelation attention mechanism, and input the fourth feature as a value vector V into the first autocorrelation attention mechanism, to obtain the offset value of the point in the second point cloud in the geometry space.

13. The decoder of claim 12, wherein the first autocorrelation attention mechanism is a multi-head autocorrelation attention mechanism.

14. The decoder of claim 10, wherein the processor is specifically configured to implement the coarse feature extension network to:

attach, in a feature dimension, an m-dimensional vector to the first feature, to obtain a sixth feature, where m is a positive integer; and input the sixth feature into a first multilayer perceptron (MLP), and input a result output by the first MLP into a second autocorrelation attention mechanism, to obtain the second feature.

15. The decoder of claim 14, wherein vector values of the m-dimensional vector are equally spaced.

16. The decoder of claim 14, wherein the m-dimensional vector is a 2-dimensional vector.

17. The decoder of claim 10, wherein the processor is specifically configured to implement the geometry generation network to:

input the second feature into a first full connection (FC) layer to obtain the second point cloud.

18. The decoder of claim 10, wherein the first point cloud is a point cloud obtained by a decoder through a decoding process.

* * * * *